United States Patent [19]
Hentges et al.

[11] Patent Number: 5,865,311
[45] Date of Patent: *Feb. 2, 1999

[54] STRIP FOR HOLDING FASTENING ELEMENTS

[75] Inventors: Guy Hentges, Gometz. Fe Chatel, France; Johann Büchel, Sevelen, Switzerland; Volker Keckeis, Röthis, Austria

[73] Assignee: Hilti Aktiengesellschaft, Schaan, Liechtenstein

[ * ] Notice: This patent issued on a continued prosecution application filed under 37 CFR 1.53(d), and is subject to the twenty year patent term provisions of 35 U.S.C. 154(a)(2).

[21] Appl. No.: 788,252

[22] Filed: Jan. 27, 1997

[30] Foreign Application Priority Data

Jan. 26, 1996 [DE] Germany ............... 196 02 789.6

[51] Int. Cl.⁶ ..................................... B65D 85/24
[52] U.S. Cl. ............................... 306/347; 206/820
[58] Field of Search ................... 206/338, 340, 206/341, 343–347, 820; 411/442, 443

[56] References Cited

U.S. PATENT DOCUMENTS

| | | |
|---|---|---|
| 2,784,405 | 3/1957 | Working, Jr. . |
| 3,775,791 | 12/1973 | Grube . |
| 3,812,961 | 5/1974 | Merrick et al. ............ 206/338 |
| 4,106,618 | 8/1978 | Haytayan ............... 206/343 |
| 4,581,964 | 4/1986 | Takatsuru . |
| 4,718,551 | 1/1988 | Whitledge ............... 206/343 |
| 4,881,643 | 11/1989 | Pfister ................... 206/338 |
| 5,046,396 | 9/1991 | Pfister ................... 411/442 |
| 5,366,082 | 11/1994 | Haytayan ............... 206/347 |

FOREIGN PATENT DOCUMENTS

| | | |
|---|---|---|
| 0330953 | 9/1989 | European Pat. Off. . |
| 2628021 | 9/1989 | France . |
| 3806713 | 9/1989 | Germany . |
| 9309918 | 3/1995 | WIPO . |
| 9509705 | 4/1995 | WIPO . |

*Primary Examiner*—Paul T. Sewell
*Assistant Examiner*—Luan K. Bui
*Attorney, Agent, or Firm*—Anderson, Kill & Olick, P.C.

[57] ABSTRACT

An elongated strip, for holding fastening elements (5) for use in explosive powder charge operated setting tools, forms a plurality of consecutively arranged hollow, cylindrically shaped spaces for holding the fastening elements (5) and with the spaces interconnected by flexible webs (2, 3). The spaces (1) each have a central axes and are positioned between parallel sidewalls extending in the elongated direction and arranged parallel to the central axes. First flexible webs (2) are formed in the sidewalls between adjacent spaces (1). The height (H2) of the first webs (2) measured parallel to the central axes of the spaces (1) are in the range of 0.3 to 0.6 times the height (H1) of the sidewalls (4) measured parallel to the central axes of the spaces (1).

3 Claims, 1 Drawing Sheet

STRIP FOR HOLDING FASTENING ELEMENTS

BACKGROUND OF THE INVENTION

The present invention is directed to an strip for holding fastening elements for use in explosive powder charge operated setting tools with consecutively arranged hollow cylindrical spaces serving as holders for the fastening elements with the spaces disposed between two elongated sidewalls arranged parallel to one another and parallel to the central axes of the spaces.

A commercially available strip for holding fastening elements for use in explosive powder charge operated setting tools is known from the Hilti/Liechtenstein Company in its product catalogue "Systems Solutions for the Building Industry 1993/1994" and identified by the designation ENP 2-21 L 15. This known strip for securing fastening elements has a number of consecutively arranged, hollow, cylindrically shaped spaces for holding the fastening elements. Spaces are interconnected to one another by a flexible web arranged in the region of the common central axes of the spaces and by two sidewalls extending parallel to one another. The sidewalls extend along the sides of the strip and run parallel to the central axes of the spaces.

The spaces in the strip serve to hold fastening elements which can be driven into a base or receiving material by an explosive powder charge operated setting tool. The fastening elements inserted into the spaces in the strip are provided with two spaced apart guide disks frictionally connected to the shank of the fastening element and radially outwardly abutting against the inside wall of the spaces.

The sidewalls of the strip have indentations running parallel to the central axes of the spaces and are positioned in a elongated edge between the spaces. The depth of the indentation is slight compared to the height of the sidewalls measured parallel to the central axes of the spaces so that the holding strip has a very high bending strength in a plane extending parallel to the central axes of the spaces as well as in a plane extending perpendicularly to the central axes of the spaces.

SUMMARY OF THE INVENTION

Therefore, the primary object of the present invention is to provide a strip for holding fastening elements for use in an explosive powder charged operated setting tool which is flexible or bendable in a plane extending parallel to the central axes of the spaces as well as having a high resistance to bending in a plane extending perpendicularly to the central axes.

In accordance with the present invention, the strip sidewalls include webs located in the region between two adjacent spaces and the webs have a height measured parallel to the central axes of the spaces corresponding at most in the range of 0.3 to 0.6 times the height of the sidewalls measured parallel to the central axes of the spaces.

Due to the inventive design of the webs formed in the sidewalls in the region between adjacent spaces, a holding strip is afforded which is flexible in a plane extending parallel to the central axes of the spaces as well as having a high resistance to bending in a plane running perpendicularly to the central axes. An elastic or flexural deformation of the sidewalls is possible in the region between the spaces holding the fastening elements due to the height measured parallel to the central axes of the spaces which is in the range of 0.3 to 0.6 times the height of the sidewalls measured parallel to the central axes of the spaces. A feed channel in an explosive powder charge operated setting tool can, due to the bendable character of the strip, include curved regions to which the strip can adapt when passing through the channel. The design of feed channels with curved regions enables the use of setting tools with small dimensions and which can also be used in places difficult to reach where the space requirement is limited.

The location of the bending axes of the strip can be affected by the arrangement of the webs in the region of the height measured parallel to the central axes of the spaces. Preferably, the webs are arranged in a central region of the height of the sidewalls measured parallel to the central axes of the spaces for reasons associated with fabrication, tension and compression strength as well as torsional strength.

The length of the webs extending in the elongated direction of the sidewalls is preferably in the range of 0.3 to 1.0 times the height of the sidewalls measured parallel to the central axes of the spaces. The elongated edges of the sidewalls are interrupted by the webs, so that when the strip bends the webs deform flexurally until the oppositely located elongated edges contact one another. Considerable bending of the strip is possible, if the length of the webs or the length of the interruptions in the elongated edges is large. However, if the length of the webs or the length of the interruptions in the elongated edges is small, only a very limited bending of the strip occurs for affording different degrees of bending in planes extending in two different directions, the length of the webs can be shortened in a preferred manner in one of the elongated edges of the sidewalls to afford a large degree of bending in the setting direction, the length of the webs shortens towards the side of the elongated edges facing in the setting direction.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there are illustrated and described preferred embodiments of the invention.

DETAILED DESCRIPTION OF THE INVENTION

Figure 1:
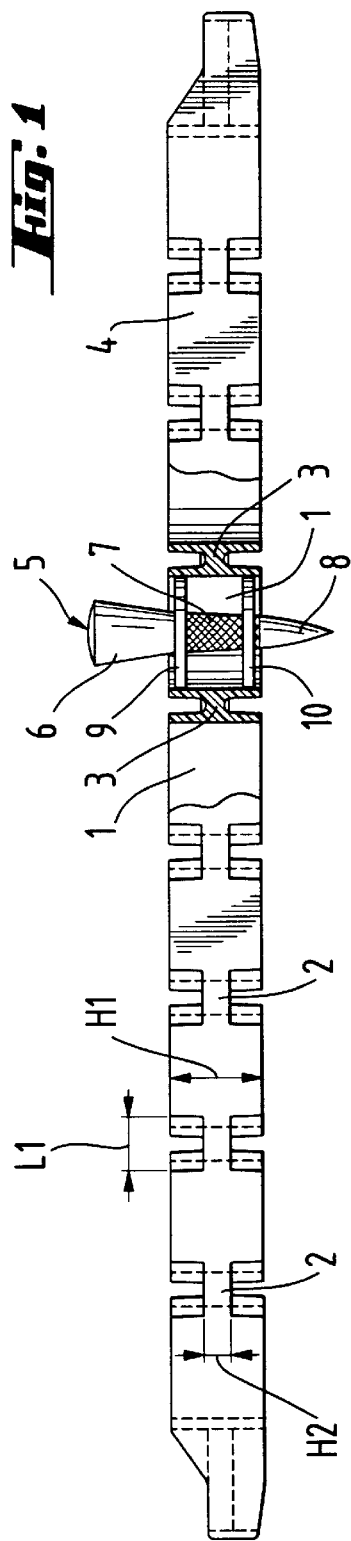
FIG. 1 is a side view of a strip for holding fastening elements and shown partially in section.
Figure 2:
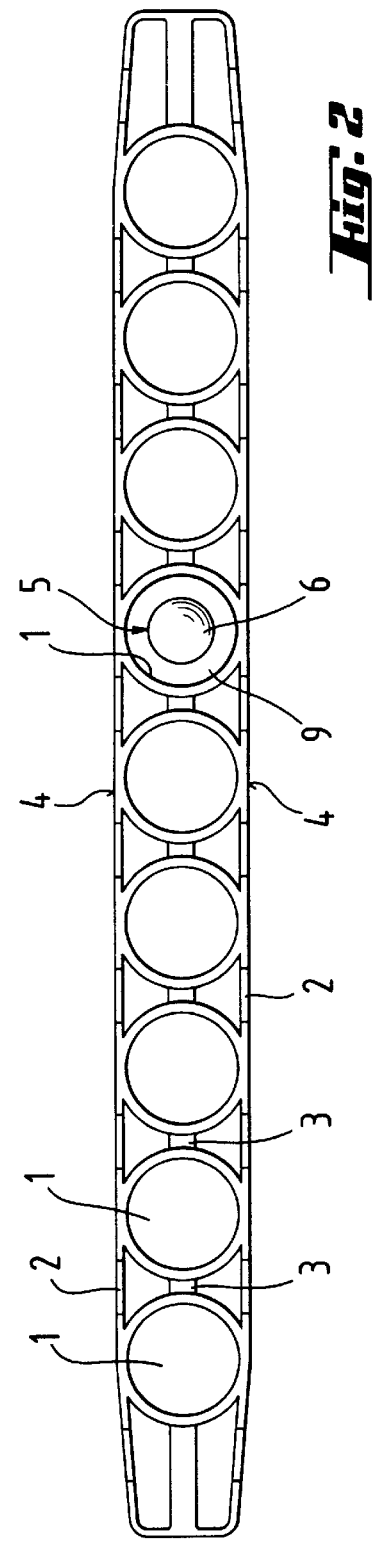
FIG. 2 is a plan view of the strip illustrated in FIG. 1.

A strip for holding fastening elements for use in explosive powder charge operated setting tools is displayed in FIGS. 1 and 2 and forms a plurality of consecutive, hollow, cylindrically shaped spaces 1 for holding fastening elements 5 each space 1 has a central axes with the central axes of the spaces located in a common plane extending in the elongated direction of the strip. Adjacent spaces 1 are interconnected by three flexible webs 2, 3. The second webs 3 are arranged in the common plane extending parallel to the central axes of the spaces and the first webs 2 extending parallel to one another are parts of the elongated sidewalls 4 disposed parallel to one another and to the common plane containing the central axes of the spaces 1. The sidewalls 4 are located along the opposite elongated sides of the strip.

The regions of the sidewalls 4 formed by the first webs 2 have a height H2, note FIG. 1, measured parallel to the central axes of the spaces 1 and at most being in the range of 0.3 to at most 0.6 times the height of the sidewall 4 measured parallel to the central axes of the spaces 1. As can be seen in FIG. 1, the first webs 2 are located in the central region of the height H1 of the sidewalls spaced inwardly from the elongated edges of the sidewalls and the length L1 of the first webs 2, extending parallel to the elongated direction of the sidewalls 4, is in the range of 0.3 to 1.0 times the height H1 of the sidewalls. As can be seen FIG. 2, the first webs 2 have a greater length L1 than the length of the second webs 3 spaced centrally between the sidewalls 4.

In FIG. 1 a fastening element or stud 5 is positioned in one of the spaces 1 and consists of a head 6, a profiled or knurled shank 7 and terminates in a pointed tip 8. Two guide disks 9, 10 are spaced apart along the central axes of the space 1 and are frictionally connected to the shank 7 at the their radially inner surfaces and abut at their radially outer surfaces against the inside wall of the space 1. Within the space 1, the guide disks 9 and 10 can be positioned against stop faces, not shown, in the form of inwardly extending projections. The first or upper guide disk 9 is located in the transition region between the head 6 and shank 7. The second guide disk 10 is located in a region of the shank 7 adjacent its tip 8.

Figure 3:
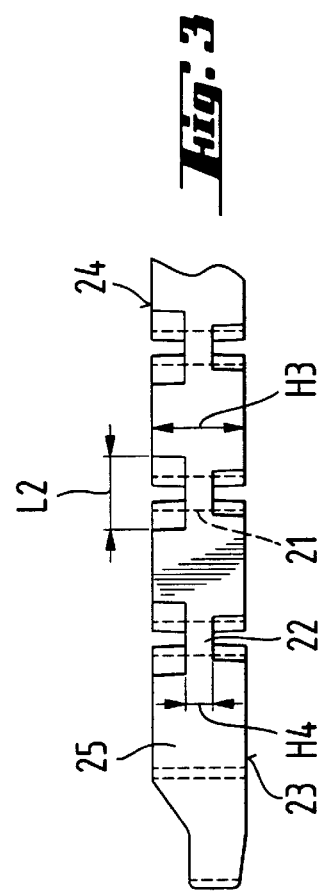
FIG. 3 is a partial side view of another strip embodying the present invention.

In FIG. 3 an end portion of another strip for holding fastening elements for use in an explosive powder charge operated setting tool is shown and comprises a plurality of consecutive, hollow, cylindrically shaped spaces 21 for holding fastening elements, not shown. Adjacent spaces 21 are connected together by three flexible webs 22. One web, not shown, is located in the region of the common plane extending through the central axes of the spaces 21 and the other webs 22 are formed as part of the elongated side walls 25 disposed parallel to one another. The sidewalls 25 extend along the opposite sides of the strip and are parallel to the plane of the central axes of the spaces 21 and each sidewall has two elongated edges 23, 24. A first elongated edge 23 is formed in the setting direction side of the strip. The second elongated edge 24 is located opposite the first elongated edge 23.

The webs 22 in the sidewalls 25 are located in the central region of the height H3 of the sidewalls 25 and have a length L2 parallel to the elongated direction of the sidewalls which is greater on the side facing the second elongated edge 24 and is shorter on the side facing toward the first elongated edge 23 of the sidewalls 25. The length L2 of these webs is in the range of 0.3 to 1 times the height H3 of the sidewalls 25.

While specific embodiments of the invention have been shown and described in detail to illustrate the inventive principles, it will be understood that the invention may be embodied otherwise without departing from such principles.

What is claimed is:

1. A strip for holding fastening elements for use in explosive powder charge operated setting tools, comprising that said strip having an elongated direction and forming a plurality of hollow laterally enclosed cylindrically shaped spaces (1) spaced apart in the elongated direction of said strip for receiving and holding fastening elements (5), said spaces each having a central axes extending perpendicularly to the elongated direction with said spaces (1) connected to one another in the elongated direction by three flexible webs (2, 3), said spaces located between a pair of parallel sidewalls (4) extending in the elongated direction and arranged parallel to said central axes, said sidewalls each having a pair of first edges extending in the elongated direction, said webs (2, 3) comprise first flexible webs (2) located in said sidewalls (4) and arranged between and spaced from adjacent said spaces (1) and second flexible webs (3) located between said sidewalls interconnecting said spaces (1) and arranged in a plane containing the central axis of said spaces, said first webs having a height (H2) parallel to the central axes in the range of 0.3 to 0.6 times a height (H1) of said sidewalls (4) measured parallel to the central axes of said spaces and perpendicularly to the elongated direction, said first webs having a pair of second edges extending in the elongated direction and spaced inwardly from and between the first edges of said sidewalls and having said height (H2) and centered between the first edges of said sidewalls.

2. A strip, as set forth in claim 1, wherein said first webs (2) have a length (L1) in the elongated direction of said strip in the range of 0.3 to 1.0 times the height (H1) of said sidewalls measured parallel to the central axes of said spaces (1).

3. A strip, as set forth in claim 2, wherein the first edges (23, 24) of the sidewalls (4) of said strip have one of said first edges (23) facing in a setting direction of the fastening elements in the strip and where the length of the second edges of said first webs (22) being shorter along one said second edge of said webs extending in the elongated direction than an opposite said second edge of said webs extending in the elongated direction and facing opposite to the setting direction.

\* \* \* \* \*